Feb. 11, 1964     B. STAHMER     3,120,932
JET-BALLOON AIRCRAFT

Filed Nov. 14, 1960     5 Sheets-Sheet 1

INVENTOR.
B. STAHMER
BY

Feb. 11, 1964

B. STAHMER 3,120,932

JET-BALLOON AIRCRAFT

Filed Nov. 14, 1960

*INVENTOR.*
B. STAHMER
BY

Feb. 11, 1964          B. STAHMER          3,120,932

JET-BALLOON AIRCRAFT

Filed Nov. 14, 1960          5 Sheets-Sheet 4

*INVENTOR.*
B. STAHMER
BY

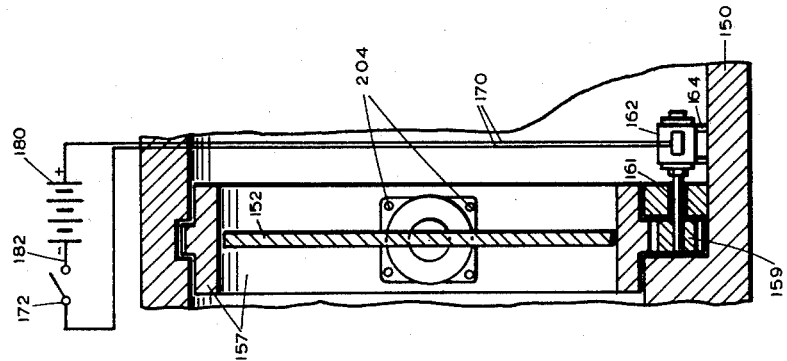
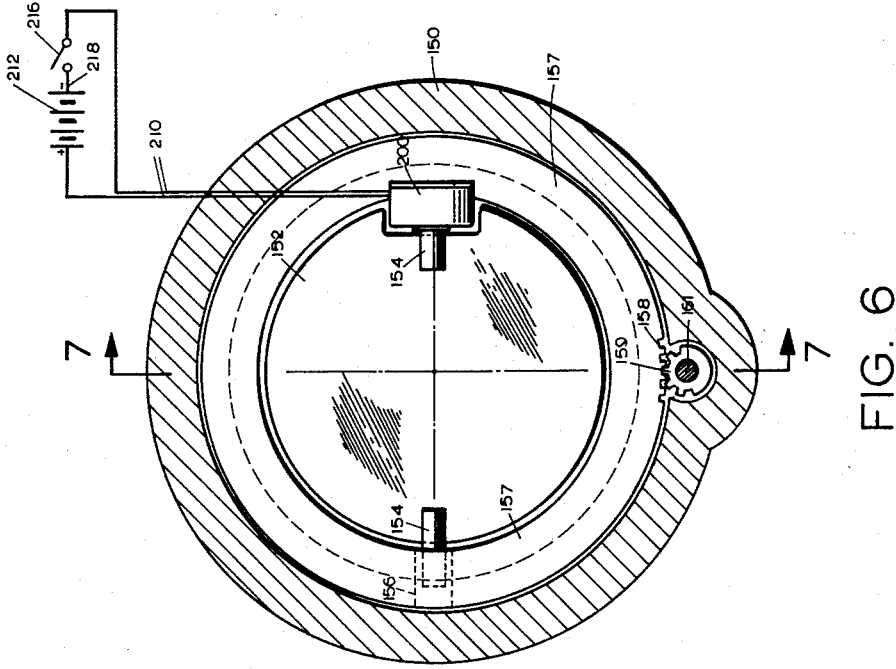

United States Patent Office 3,120,932
Patented Feb. 11, 1964

3,120,932
JET-BALLOON AIRCRAFT
Bernhardt Stahmer, 1509 Chicago, Omaha, Nebr.
Filed Nov. 14, 1960, Ser. No. 69,132
1 Claim. (Cl. 244—24)

This invention relates to jet aircraft and more particularly it is an object of the invention to provide a jet aircraft which is capable of transporting far greater weight in proportion to the size of its jet engines than heretofore.

Jet aircraft have been developed primarily for speed and such jet aircraft as have been designed for carrying cargo have been adapted to carry only a relatively small cargo and it is the object of this invention to provide a jet aircraft which utilizes the heat, generated by the jet engine, in a balloon attached to the aircraft whereby this heat, in the form of hot gases from the engine exhaust, provides the hot gases for the lifting effect of the balloon, whereby a much heavier cargo can be carried than otherwise.

A further object is to provide means for mixing cool air with the jet exhaust gases for providing the balloon with air that is not so hot as to cause deterioration of the balloon from the heat of the gases entering it.

Yet a further object is to provide a jet aircraft, the exhaust gases of which can be selectively diverted either into a gas bag, or to the rear of the aircraft for forward propulsion.

Yet another object is to provide an aircraft as described, gases from the gas bag of which can be selectively delivered rearwardly for forward propulsion or downwardly for upward propulsion, whereby a maximum use is made of the gases entering and leaving the gas bag since the change of gas bag is necessary for replacing cool gases in the gas bag with new hot gases.

Still another object is to provide an aircraft as described having means for holding the gas bag away from the jet engine at times when it is collapsed.

Yet another object is to provide a jet aircraft with controls as described which can be operated from one or more central control panels.

Still a further object is to provide a jet aircraft as described which is provided with parachute means for slowing the descent of the aircraft whenever desired.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 6 is a detail showing a sample of the thrust deflector and the thrust deflector control mechanism of a kind used at two places on the aircraft, the view being from the forward side of the mechanism with gas flow conduit surrounding the mechanism shown in section.

FIGURE 7 is a sectional view taken along the line 7—7 of FIGURE 6.

Figure 1:
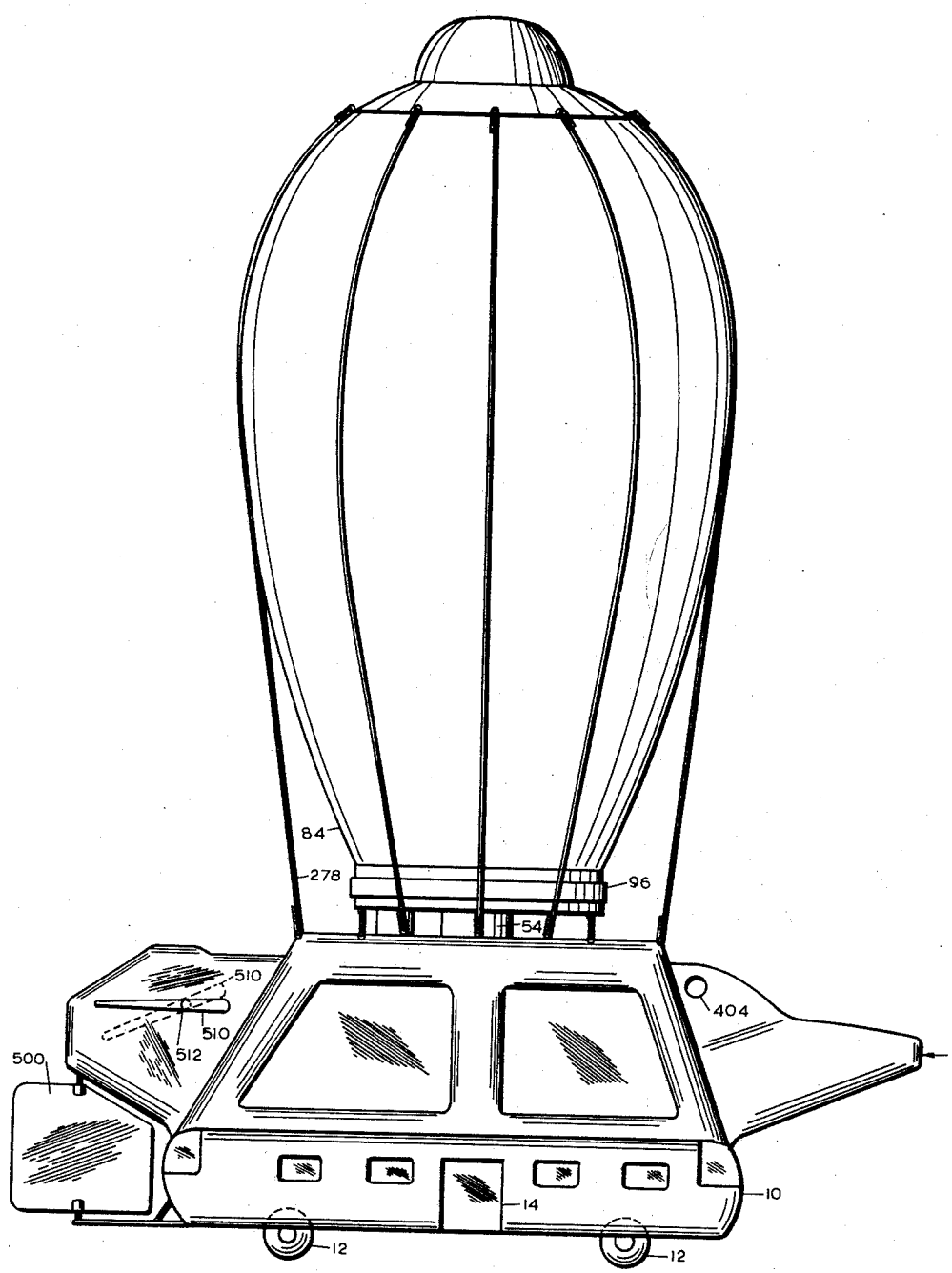
FIGURE 1 is a side elevation of the aircraft of this invention.

Referring to FIGURE 1, it will be seen that the aircraft of this invention comprises a gondola 10 having wheels 12, a cargo door 14 and the large interior area 16 suitable for carrying a heavy cargo.

Figure 2:
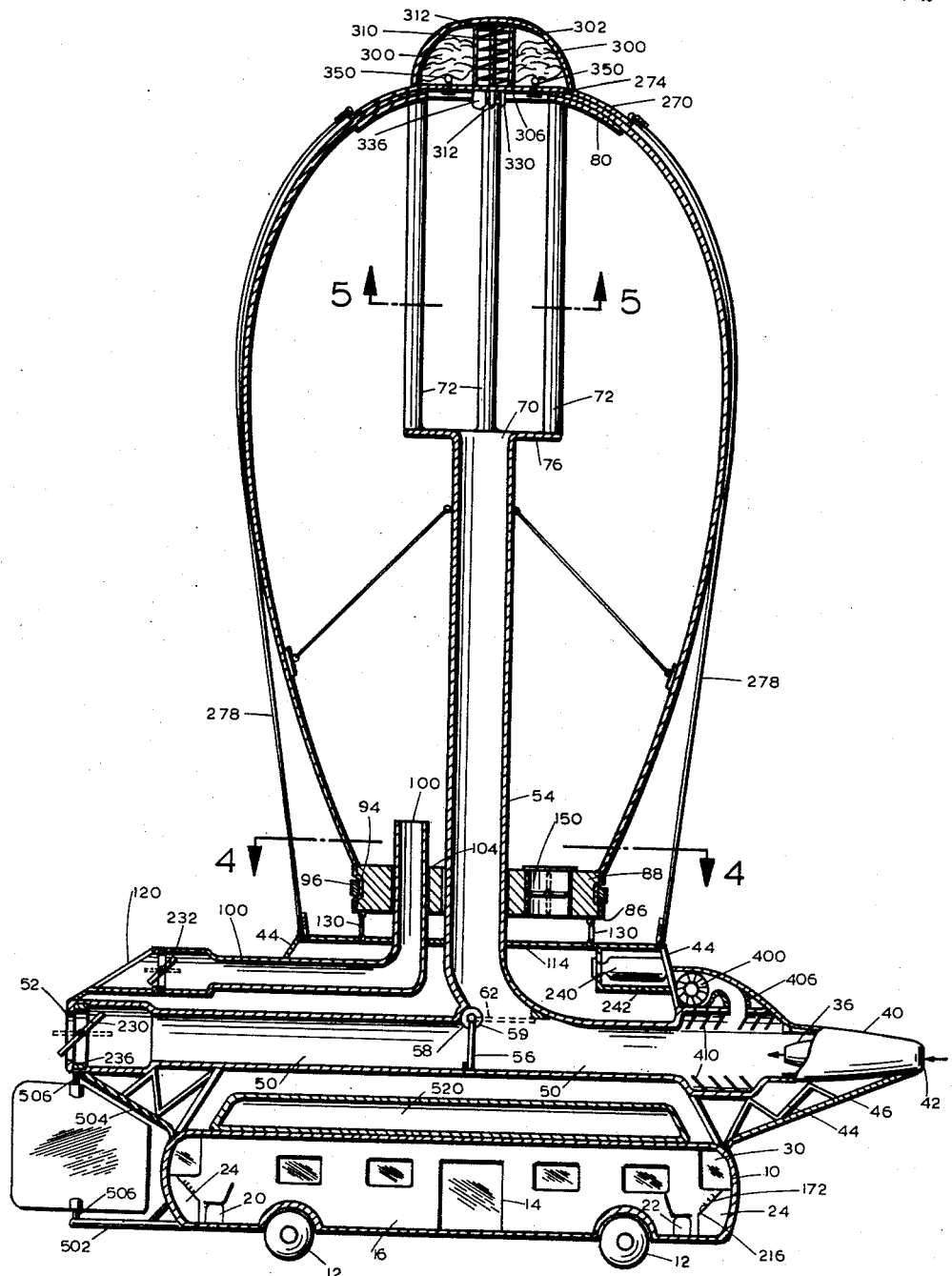
FIGURE 2 is a view of the aircraft with the forward side of substantially all parts removed for showing the remainder in-section.

The gondola 10 would house pilot's quarters including seats 20 and 22 for pilot and co-pilot as best seen in FIGURE 2 each being near a control panel 24 and having visibility through suitable windows 30.

As best seen in FIGURE 2, a jet engine 36 is mounted in a housing 40 which latter is open at its forward end 42 for air intake to the jet engine 36.

The jet engine is supported in suitable framework 44 having covering 46 and in the framework or housing 44 a longitudinally extending or forward-to-rearwardly extending tube or conduit 50 is mounted for carrying exhaust gases from the engine 36 to the rear of the aircraft where they are exhausted out an opening 52 for discharge whereby the gases from the jet engine 36 can cause forward propulsion.

An upwardly extending tube or conduit 54 joins the conduit 50 on its upper side and a deflecting vane 56 is mounted on a pivotal mounting 58 in a position for being disposed downwardly as shown in FIGURE 2 to deflect all gases from the jet engine upwardly into the vertical tube 54. The vane 56 may also be swung into an upper position 62 where it is shown in dotted lines in FIGURE 2 in a position for blocking the passage of gases into the vertical tube 54 whereby they are all diverted to the rearward through the tube 50.

Optionally, the vane or valve means 56 can be placed in a position between the position shown in FIGURE 2 for diverting part of the gas upwardly and part of the gas rearwardly in whatever proportion as is desired as obtained by suitable control means not shown but controllable from the control panels 24 of the gondola.

The vane 56 serves to deflect the gases upwardly where they can pass out through an opening 70 in the top of the tube 54 thereby pass freely outwardly between vertical supports 72 which latter are mounted on a flange 76 on the upper end of the tube 54 whereby they extend upwardly to a gas bag supporting member 80 which is disposed generally horizontally across the top of the support 72.

The gas bag supporting member 80 is actually convex on its upper side as is also a gas chamber housing gas bag or balloon 84 which latter extends downwardly and has an otherwise open lower end 86 enclosed by closure wall 88 which extends horizontally across the lower end of the gas bag and is suitably fixed to and supported by the vertical tube 54.

The closure wall 88 has a notch 94 extending around its periphery, the notch 94 being annular and adapted to receive a securing ring 96 therein for holding the gas bag tightly to the closure wall 88.

Gas in the gas bag 84 can escape through a rearward gas delivery conduit or vent tube 100 which extends downwardly through a suitable opening 104 in the horizontal closure wall 88 and passes through an anchor plate 114 which is suitably mounted on framework 44 of the aircraft, then the conduit 100 turns rearwardly and has an opening 120 at the rear end of the aircraft whereby gases passing through the opening 120 propel the aircraft forwardly.

Figure 4:
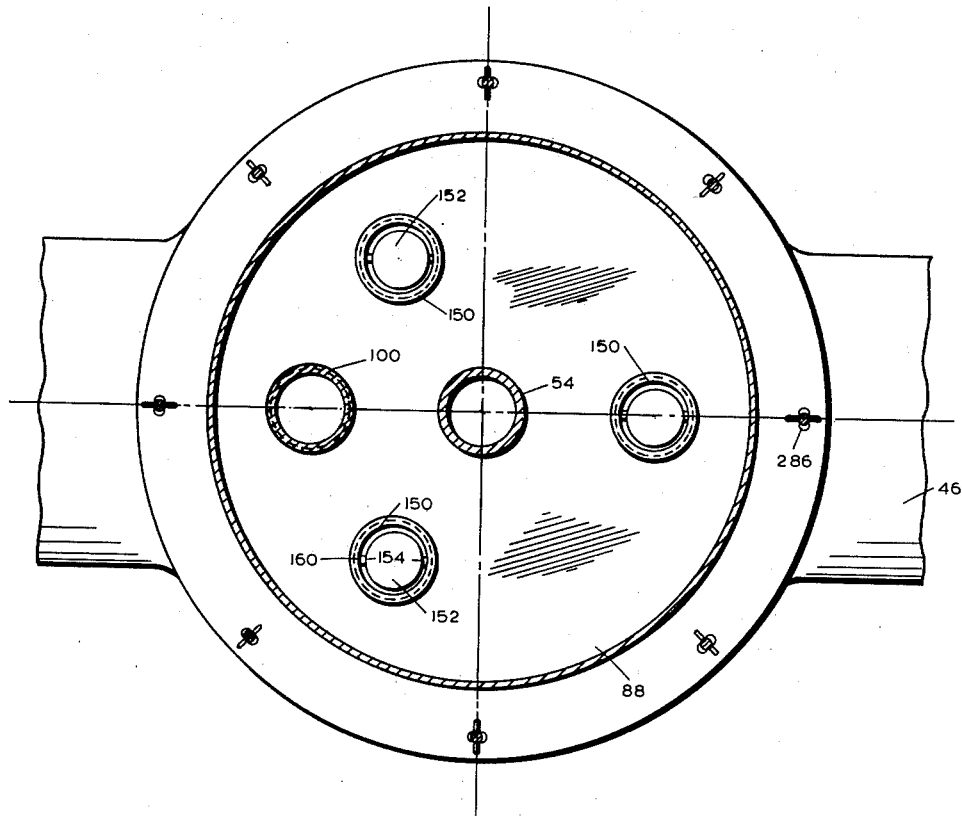
FIGURE 4 is a sectional view taken along the line 4—4 of FIGURE 2.
Figure 5:
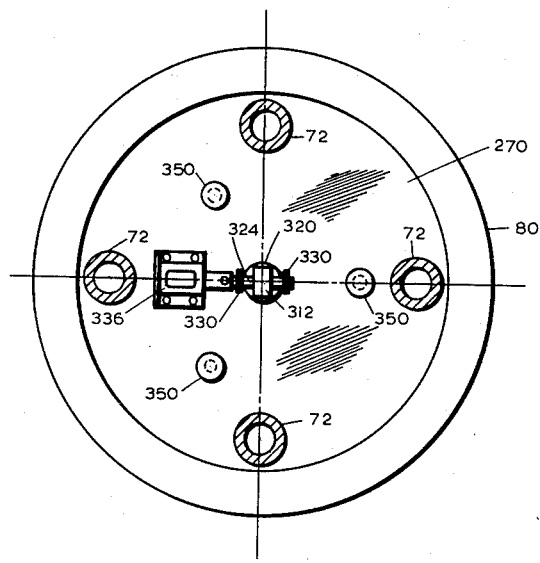
FIGURE 5 is a sectional view taken along the line 5—5 of FIGURE 2.

The horizontal closure wall 88 is attached to the plate 114 by suitable anchoring assemblies 130 and the closure wall 88 has a plurality of vertical exhaust conduits 150 therethrough which may be spaced apart on the closure wall 88 in any suitable position as best seen in FIGURE 4. However, they are preferably symmetrically arranged with at least one on the right hand and one on the left hand side of the aircraft.

The vertical discharge conduits 150 are closed by suitable means 152 which are mounted for pivoting about an axle 154 which latter is rotatably mounted in a vertical discharge conduit housing 160 at each discharge conduit 150. The vanes 152 are shown in FIGURE 4 as being mounted each on stub axles 154 which are themselves mounted in a housing 160.

The construction at each of the down draft conduits 150 is the same as at the others.

Referring to FIGURE 6, the details of construction of the vanes 152 are there shown. In FIGURE 6 a portion of the top of a conduit 150 is broken away for showing the vane 152 mounted on a stub axle 154 on one side which is pivotally mounted for rotation in a suitable bearing indicated at dotted lines 156, the bearing being received in a control ring 157 having teeth 158 around its circumference in mesh with a gear 159 rotating on a shaft 161 which latter is disposed in parallelism with the respective discharge conduits 150. The shaft 161, as best seen in FIGURE 7, is attached to an electrical motor 162, fixed by a mounting 164 to the inner side of the discharge conduit 150, the motor being controlled through its wires 170 leading respectively to a switch 172 which can be one of the switches on the control panel 24. The other wire 170 leads to a battery or other power supply source 180 which has a wire 182 connected to its other terminal and leading to the switch 172. As thus described the motor 162 can be operated from the control panel 24 in order to rotate the gear 159 and thereby rotate the control ring 157 which surrounds the vane 152.

In this way, the vane 152 of each down draft conduit 150 can be rotated to direct the flow of outgoing air forward, reverse, or to the right or left.

As may be desired, the vane 152 can be placed nearer to the bottom of the gas bag attachment member 88 there shown.

The other stub axle 154 of each vane 152 is secured to the respective vane 152 as both stub axles 154 are. However, the other stub axle 154 is connected to or is the shaft of a motor 200 as best seen in FIGURE 6 which latter is suitably mounted on the control ring 157 by bolts 204.

The motor 200 has wires 210 leading from it, one wire to a battery 212 or other suitable source of power, and the other wire to a switch 216 which latter has its other terminal connected to the opposite terminal of the battery 212 by a wire 218.

The switch 216 is one of many switches on the control panel 24 in the gondola.

The structure described and as shown in FIGURE 6 is repeated at each of the downward discharge conduits 150 and so the showing of FIGURES 6 and 7 serve to illustrate all of these.

As thus described it will be seen that the motor 200 can control the vanes 152 whereby it is open or less open proportionally to the position desired by an operator at the control panel 24.

It will be seen that in the rearward discharge tube 50 and the rearward discharge conduit 100 there are vanes 230 and 232 respectively which are constructed similarly to the vanes 152 above described and as shown in FIGURES 6 and 7 and all construction surrounding the vanes 230 and 232 can be similar in all respects to the construction of FIGURES 6 and 7 whereby suitable motors control both the vanes 230 and 232 and control rings surrounding them which latter are seen in FIGURE 2 at 236 and 238, both of which being identical in construction, if not in size, to the control rings 157 of FIGURE 6 and FIGURE 7.

The aircraft can further have a turbogenerator indicated at 240 geared to the frame at 242 which latter can generate electricity in substitution for the batteries 180 and 212 shown in FIGURES 6 and 7 primarily as diagrammatic ways to illustrate the electrical circuit.

Figure 3:
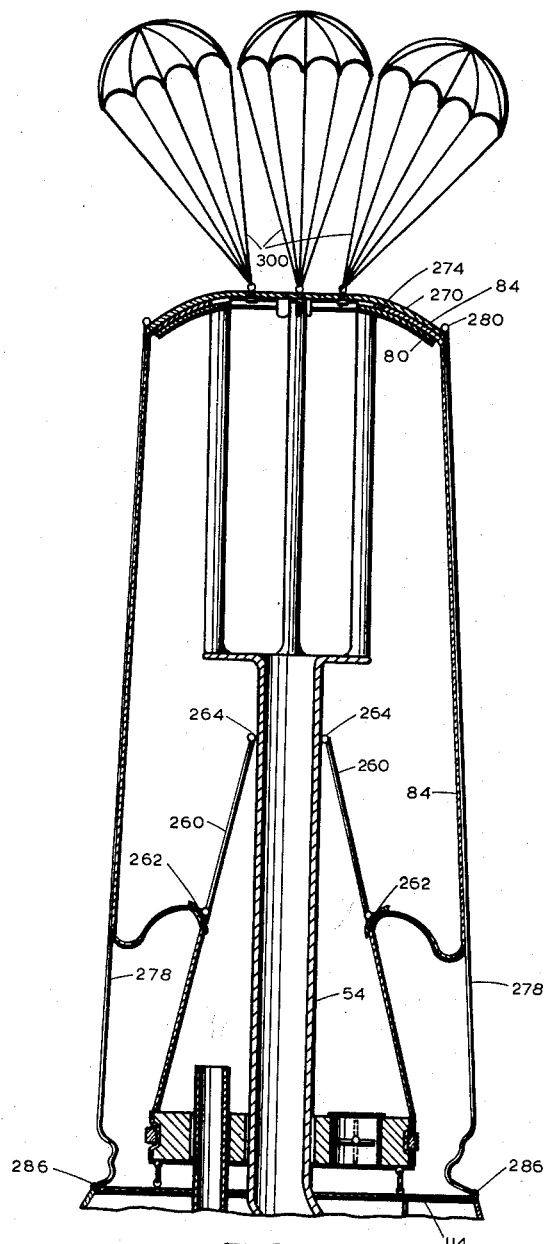
FIGURE 3 is a detail showing the use of parachutes at times when the gas bag is collapsed.

Referring now to FIGURE 3, we there see that the gas bag 84, when it is in its collapsed state, could hang downwardly over other parts of the aircraft, as is undesired. Because of this, elastic cords 260 are provided attached suitably at 262 to the inner sides of the gas bag and extending upwardly and inwardly to attachments at 264 on the vertical gas conduit 54 whereby whenever the gas bag is inflated, the elastic cords 260 can stretch permitting the gas bag to assume the position shown in FIGURE 2, and whereby when the gas bag is deflated, it will be upheld by the cords 260 pulling it upwardly and inwardly as shown in FIGURE 3.

Referring to FIGURE 3, it will be seen that the gas bag supporting member 80 is disposed on the underside of the uppermost part of the gas bag 84 and that a gas bag holding member 270 is disposed on the upper side of the gas bag at its top, the gas bag holding member 270 being substantially closed so that gas cannot pass through it whereby the upper end of the gas bag has an opening 274 which is closed by the gas bag cover 270, suitable means such as adhesive or the like, not shown, holding the gas bag support 80 and cover 270 to the gas bag itself.

Supporting cables 278 extend downwardly from attachment to the cover 270 by eyelets 280 to other eyelets 286 attaching the cables 278 to the anchoring member 114, the cables 278 being on all sides of the gas bag.

Referring to FIGURE 2, we see that the opening 274 in the top of the gas bag 84 provides a space below the cover 270 in which certain mechanisms can be located for controlling a parachute system, as later described.

Referring to FIGURE 2, we see the parachutes in collapsed position under a parachute housing 302 which latter has a concave under surface and has its lower edges abutting the upper side of the cover 270 of the gas bag whereby ordinarily no wind can catch in the parachutes 300 so that they remain closed.

However, beneath the cover 302 is a cylindrical housing seen in section at 306 in FIGURE 2 and fitting around a coiled spring 310. The spring 310 bears against cover 270 and tends to urge the member 302 upwardly so that it would fly off permitting the parachutes 300 to be caught by the wind and open into the position shown in FIGURE 3.

However, a rod 312 is attached to the underside of the member 302 also extends downwardly through an opening 320 in the cover 270 and beneath the cover 270 a pull pin 324 extends slidably through the rod 312 and also through certain pull pin bearings 330 attached to the underside of the cover 270 whereby the operation of a solenoid 336 is also attached to the underside of the cover 270 and attached to the pull pin 324 tends to pull the pin 324 toward the solenoid 336 sufficiently to release the bar 312 whereby the spring 310 operates to throw the cap 302 off into the air whereby the wind can catch the parachutes 300 and cause them to open.

The parachutes 300 are each suitably attached by members 350 to the cover 270 whereby since the cover 270 is secured to the bag 84 and to the support 80, which latter itself is suitably secured to the member 72, it will be seen that the parachutes will effectively restrain the gondola and the entire aircraft from moving downwardly at an undue speed.

It will be seen that the parachutes 300 are merely diagrammatic and could be much larger than as shown in FIGURE 3 when desired.

Referring to FIGURE 2, it will be seen that a suitable blower 400 is provided and powered by suitable means, not shown, whereby it tends to draw air through a port 404 in the side of the aircraft as seen in FIGURE 1 and direct this air downwardly through a chute 406 whereby it passes into the vertical discharge tube 50 mixing with the hot gases from the jet engine 36 for tearing down the high temperature of the jet gases to form a mixture which can be safely delivered into the gas bag without damaging the bag from excess heat.

Certain baffles 410 shown in FIGURE 2 are attached to the inner side of the tube 50.

As best seen in FIGURE 1, steering of the aircraft can be assisted by a rudder 500 attached to framework members 502 and 504, as seen in FIGURE 2, by stub axles 506 and the position of the rudder can be controlled by any means not shown.

Also, the aircraft can be diverted upwardly or downwardly by ailerons 510 disposed one on each side of the aircraft, one of which is illustrated in FIGURE 1 with a dotted line position showing the position for deflecting the aircraft downwardly, the ailerons being suitably mounted on an axle 512 through which it is controlled from the control panel as is the rudder 500 by means not shown.

From the foregoing description, it is thought to be obvious that a jet balloon aircraft constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a jet aircraft: a frame, a jet engine mounted on said frame, a gas chamber housing attached to said frame, means interconnecting said gas chamber and the exhaust of said jet engine for filling said chamber with hot exhaust gases, said gas chamber housing being of a size for providing a substantial lifting force on said aircraft when said chamber is full of hot gases from said jet engine, means attaching said gas chamber housing to said frame, said gas chamber housing having a downwardly opening exhaust conduit extending through the under side thereof and open to the atmosphere for providing a lifting force from the jet effect of gases rushing downwardly out through said downwardly opening exhaust conduit, movable and controllable deflecting vane means at the exit of said downwardly opening exhaust conduit for directing the exhaust gases in a direction at least partially rearward for forward propulsion, and means movably mounting said vane means at said exit, said interconnecting means being a tube, and means comprising a powered air blower disposed between said tube and the atmosphere for delivering cooling atmospheric air to said tube to admix with the hot jet exhaust gases to provide a mixture of reduced temperature which can be safely delivered into said gas chamber housing without damaging said housing.

References Cited in the file of this patent
UNITED STATES PATENTS

| | | |
|---|---|---|
| 612,808 | Smith | Oct. 18, 1898 |
| 1,061,484 | Lowe | May 13, 1913 |
| 1,274,207 | Sorkyka | July 30, 1918 |
| 1,677,308 | Stokes | July 17, 1928 |
| 2,444,642 | Frieder et al. | July 6, 1948 |
| 2,690,886 | Laskowitz | Oct. 5, 1954 |
| 2,693,079 | Rau | Nov. 2, 1954 |
| 2,879,014 | Smith et al. | Mar. 24, 1959 |
| 2,988,302 | Smith | June 13, 1961 |

OTHER REFERENCES

"Flight," vol. 60, issue 2232, page 560, Nov. 2, 1951.